Patented Oct. 20, 1942

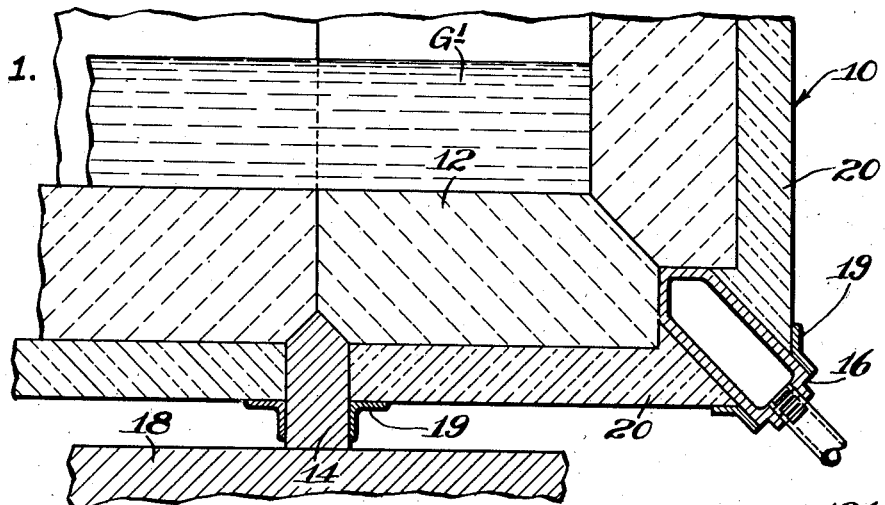
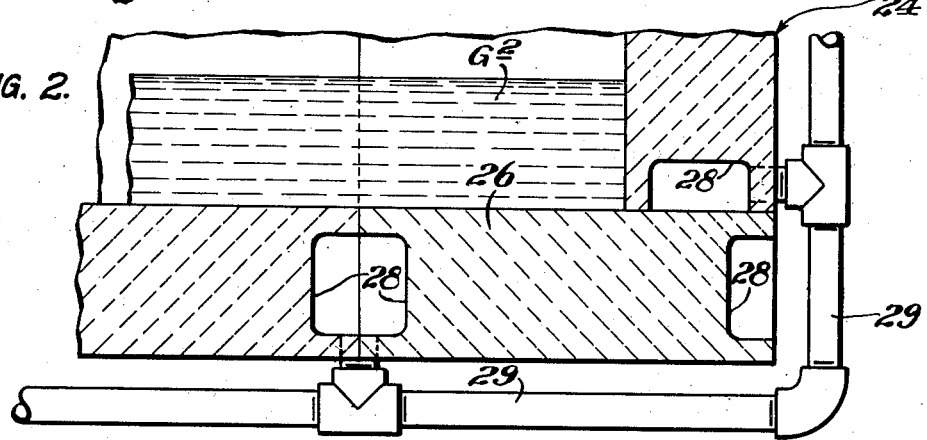
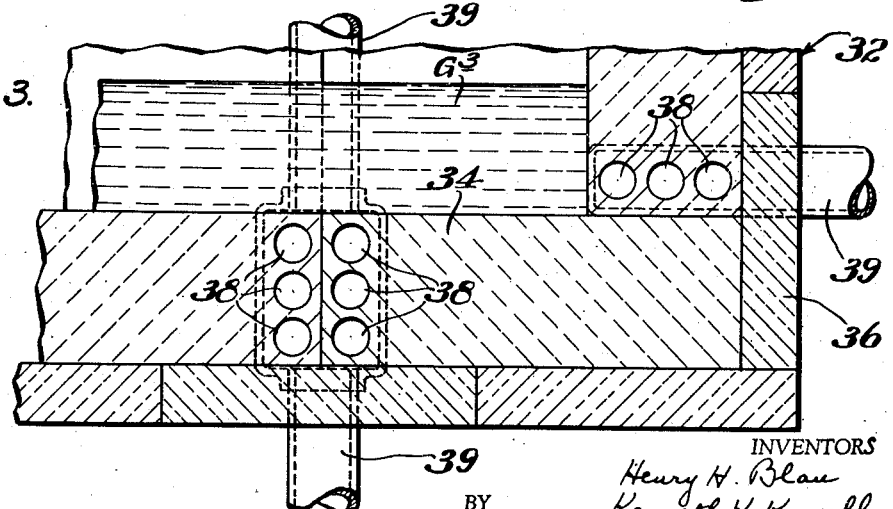

2,299,608

UNITED STATES PATENT OFFICE 2,299,608

MELTING TANK AND APPARATUS FOR COOLING SEAMS THEREOF

Henry H. Blau, Elmira, N. Y., and Kenneth K. Knaell, Charleroi, Pa., assignors, by mesne assignments, to The Carborundum Company, Niagara Falls, N. Y., a corporation of Delaware Original application October 15, 1937, Serial No. 169,108. Divided and this application September 19, 1939, Serial No. 295,596

9 Claims. (Cl. 49—54)

This invention relates to tanks or furnaces for melting material, such as glass or the like, and more particularly is concerned with apparatus for cooling the seams between blocks or bricks forming the melting tanks.

It is the general object of our invention to provide improved melting tanks and apparatus for effectively sealing the seams thereof wherein initial and maintenance costs are relatively low.

Another object of our invention is the provision of an improved glass melting tank in which glass can be melted or refined without leakage thereof through the seams of the tank.

Another object of our invention is to provide apparatus for cooling the seams of material melting tanks and for simultaneously heating the material through the blocks forming the tank.

Another object of our invention is to provide means for clamping the refractory blocks of a glass melting tank in position, which means also function to seal between the individual blocks forming the tank.

Another object of our invention is the provision of an improved glass melting tank formed of cast refractory blocks of high thermal conductivity wherein the seams or joints between the blocks are sealed to prevent the escape of the molten glass.

Figure 4:
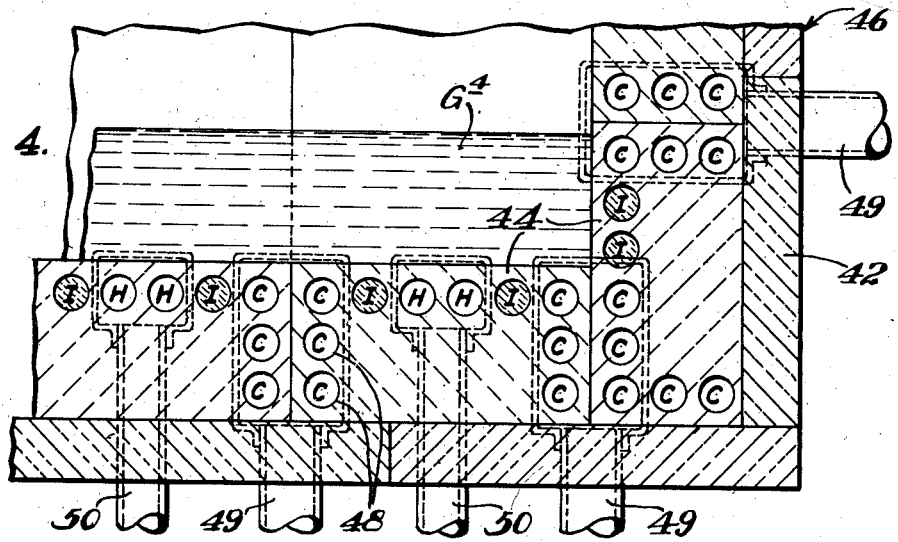
Figure 5:
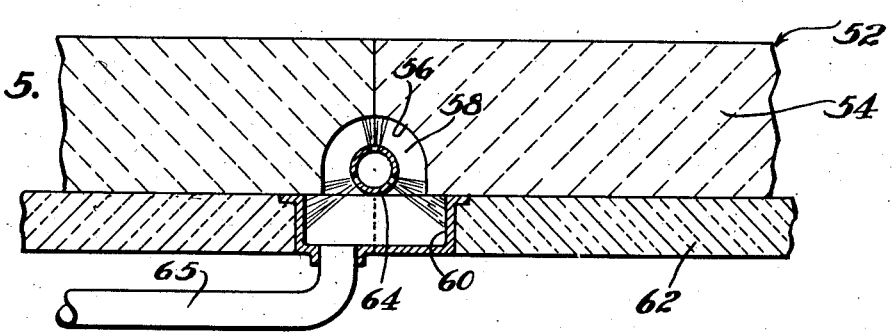
Figure 6:
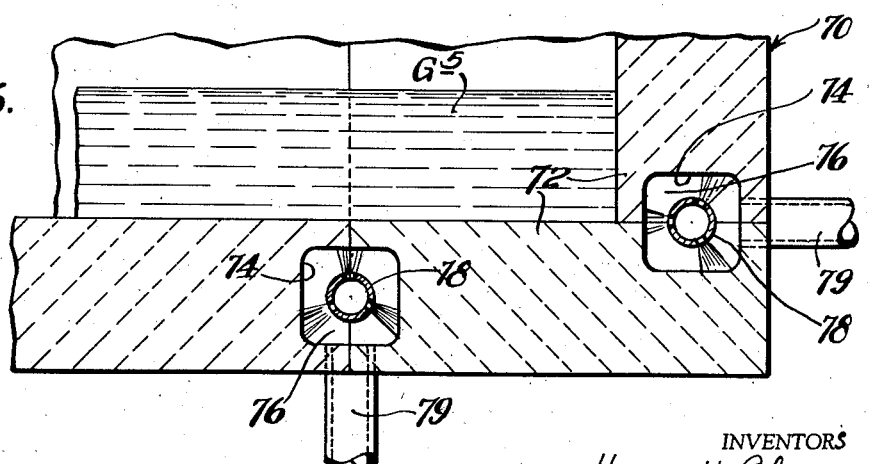
Figure 7:
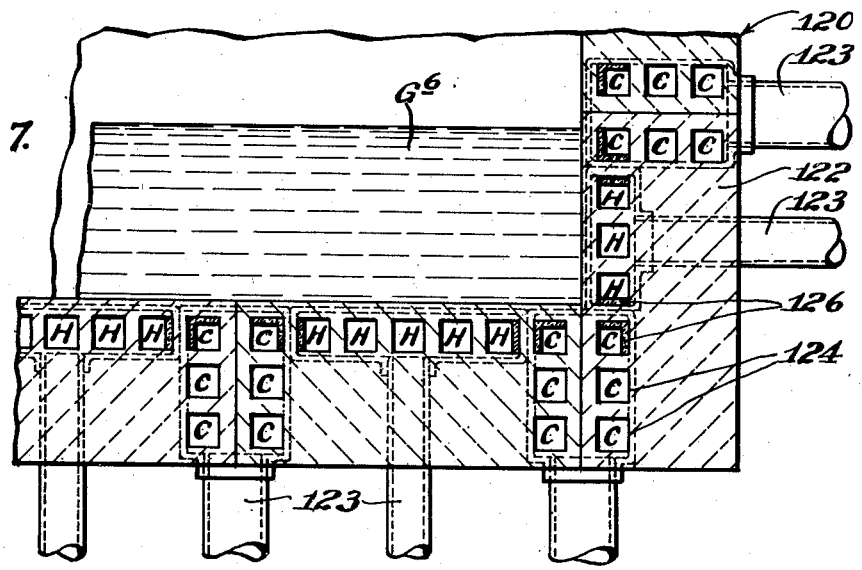
Figure 8:
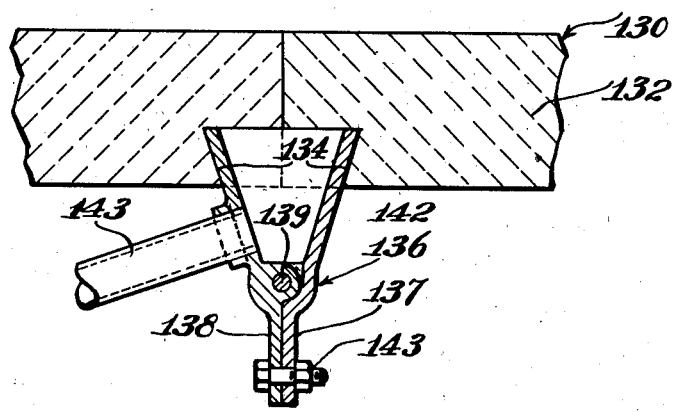
Figure 9:
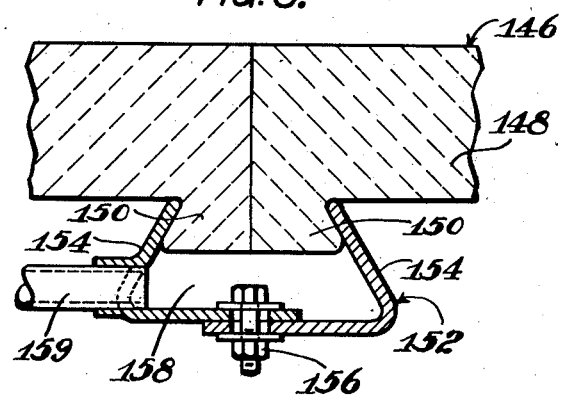
Figure 10:
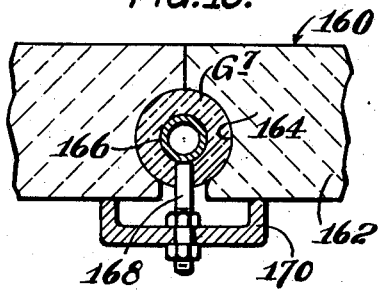

The foregoing and other objects of our invention are achieved by the methods and apparatus illustrated in the accompanying drawings wherein Fig. 1 is a vertical cross-sectional view through a melting tank, partly broken away, constructed in accordance with the principles of our invention; Fig. 2 is a view similar to Fig. 1 but of a modified form of our invention; Fig. 3 is a view similar to Fig. 1 but illustrates another form of the invention; Fig. 4 is a view similar to Fig. 1 but shows still another embodiment of the invention; Fig. 5 is a horizontal cross-sectional view through a portion of a glass tank illustrating another embodiment of our invention; Fig. 6 is a view similar to Fig. 1, but of another form of our invention; Fig. 7 is a view similar to Fig. 1 but of another embodiment of our invention; Fig. 8 is a cross-sectional view through a tank wall wherein the means for clamping the blocks in position also function to cool the seam therebetween; Fig. 9 is a view similar to Fig. 8 but of a modified form of clamp and cooling means; and Fig. 10 is a view similar to Fig. 8 but of still another embodiment of the invention.

While it has long been a problem to confine molten material in melting tanks or furnaces due to seepage between the blocks forming the material contacting walls and bottom thereof, we have found that in the use of cast refractory blocks for glass tanks the thermal conductivity of the cast refractory is so high that seepage of glass between the joints or seams of the blocks is a serious problem. Accordingly, the several embodiments of our invention herein described and illustrated are concerned, broadly, with sealing between the refractory blocks of material melting tanks, and, particularly, between cast refractory blocks forming the walls and bottom of a glass melting tank.

Having particular reference to Fig. 1, the numeral 10 indicates generally a glass melting tank formed of individual cast refractory blocks 12 and carrying a batch of molten glass $G^1$. The edges of the blocks 12 are beveled and receive pointed members 14 and 16 of very high heat conductivity as compared to the conductivity of the blocks 12. The members 14 and 16 serve to withdraw heat very rapidly from the seams or joints between the blocks 12 when positioned as shown, so that molten glass seeping into the seams is chilled by the members to seal the seams and thereby prevent any further seepage of the molten glass therethrough. The members may take a plurality of forms but preferably comprise solid metal or silicon carbide bars, such as the member 14, or hollow conduits such as the member 16 through which cooling fluid, such as water, can be circulated. The members 14 and 16 preferably serve as supporting beams or vertical joists for the individual blocks comprising a tank and may engage with a foundation or backing member 18. Angles 19 secured to the members 14 and 16 preferably are provided to assist in carrying the load of the blocks. Completing the assembly are heat insulating pads 20 of very low thermal conductivity which surround the tank.

In the form of our invention illustrated in Fig. 2, the numeral 24 indicates generally a glass melting tank formed of individual cast refractory blocks 26 and receiving molten glass $G^2$. The individual blocks 26 are formed with channels 28 at their ends so that when the blocks are assembled edge to edge a closed passageway is formed between the contacting edges of the blocks. Cooling fluid, such as air, is circulated through the passages from suitable header means 29 and under any desired pressure.

In the embodiment of the invention illustrated in Fig. 3, the numeral 32 indicates generally a glass melting tank formed of individual cast refractory blocks 34 enclosing a molten body of glass $G^3$. The blocks are in turn surrounded by heat insulating blocks 36. Each of the cast refractory blocks 34 is formed with a plurality of openings 38 therethrough which, in the operation of the tank, are in opposed relation adjacent the joints or seams between the individual blocks. Cooling fluid such as air is circulated through the passages 38 by conduits 39 extending thereto so that any molten glass tending to seep through the joints or seams is frozen and the tank remains fluid tight in use.

The numeral 42 indicates generally in Fig. 4 a glass melting tank formed of individual cast refractory blocks 44 and surrounded by heat insulating pads 46. Molten glass G⁴ is illustrated in the tank. The individual refractory blocks 44 are provided with a plurality of openings 48 in the positions illustrated in Fig. 4 and these openings are cooled, insulated or heated as by the passage of cooling or heating fluid therethrough via conduits 49 and 50 and the use of an insulating filler, all in accordance with the showing in the drawings. More particularly, the openings marked C are cooled, the openings marked I are insulated, and those marked H are heated. It will be seen that the portions of the blocks 44 adjacent the joints or seams are cooled so that molten glass tending to seep through the joints is frozen.

In the embodiment of our invention shown in Fig. 5, the wall of a melting tank is indicated by the numeral 52 and comprises individual cast refractory blocks 54 formed with grooves 56 at their edges so that when the edges of two blocks are placed together a passage 58 is provided which is covered by a metal channel 60 secured to the blocks 54, as for example, by heat insulating blocks 62. Positioned in the passage 58 is a conduit 64 which carries a cooling fluid which is discharged through suitable openings in the conduit 64 to provide fluid sprays in the passage 58 so that any molten glass seeping through the joint between the blocks 54 is frozen.

More particularly, in conjunction with this embodiment of our invention, we contemplate passing cooling fluid, such as air, through the passage 58 from supply conduit 65 and then controlling the temperature of the cooling fluid by spraying the fluid with a liquid, such as water, carried in the conduit 64. By the combined use of air and water for cooling in this manner a very complete control of the seam cooling is provided which is more satisfactory than either air or water alone.

In Fig. 6 is illustrated still another embodiment of our invention wherein the numeral 70 indicates generally a portion of a glass melting tank including individual cast refractory blocks 72 each formed at their ends with channels 74 so as to provide passages 76 between adjacent and contacting block portions. The passages 76 receive conduits 78 which are formed with openings so that water or other liquid cooling fluid carried by the conduits can be sprayed onto the surface of the blocks and so that air or other gaseous cooling fluid carried in the passages 76 and supplied thereto by conduits 79 can be cooled or humidified as desired. Molten glass is indicated at G⁵.

In the embodiment of our invention illustrated in Fig. 7 the numeral 120 indicates generally a glass melting tank formed of cast refractory blocks 122 and supporting molten glass G⁶. The individual blocks 122 are formed with passages 124 which are cooled or heated by suitable fluid via conduits 123, as indicated respectively by the letters C and H. This embodiment of our invention differs from that illustrated in Fig. 4, and heretofore described, in that the individual passages 124 are formed with heat insulating means 126 between adjacent passages carrying heating and cooling fluid. In this manner the fluid used to cool the passages marked C is directed toward the cooling of the seams or joints of the tank and the heating fluid passed through the passages marked H is insulated away from the cooled portions of the blocks. By a construction of this kind we are able to simultaneously cool the seams between the blocks and heat the molten glass in the tank through the walls of the blocks in contact therewith.

An important part of our inventive concept is the provision of means for clamping the blocks forming a wall of the melting tank in position with the means functioning also to carry a cooling fluid adjacent the seams or joints between the blocks. Thus in Fig. 8 we have illustrated a tank wall 130 formed of individual cast refractory blocks 132 each provided with an undercut 134 at its edge. Associated with the undercuts 134 of adjacent seam edges is a combined clamp and conduit, indicated as a whole by the numeral 136. This clamp and conduit comprises plate-like halves 137 and 138 hinged together as at 139. The opposed plate-like portions engage under the overhangs 134 at the ends of the blocks and the portions of the plates on the other side of the hinge are connected together by a plurality of bolts 140. Thus when the blocks are clamped together as shown, by inserting the ends of the plates 137 and 138 under the overhangs and then drawing down the bolts 140, a conduit or passage 142 is provided in the region of the joint between the blocks. Fluid, such as air, can be passed through the passage 142, via conduits 143, to cool the seam and the blocks are held in proper position by the clamping conduit 136.

In Fig. 9 the numeral 146 indicates generally a wall of a material melting tank formed of individual cast refractory blocks 148 each provided with a rib 150 at its edges. The ribs 150 are gripped by a clamping conduit 152 comprising flange portions 154 engaging behind the ribs and locked in position by a plurality of bolts 156 which are adjustable in slots. Thus the clamping conduit 152, when in the position illustrated, functions to simultaneously clamp the blocks together and to provide a passageway 158 for the reception of cooling fluid, such as air, which can be passed therethrough, by way of conduits 159, to cool the joint or seam between the refractory blocks 148.

In the form of our invention illustrated in Fig. 10 the numeral 160 indicates generally a tank wall formed of cast refractory blocks 162 which are provided with grooved edges 164 adapted to receive a pipe or other conduit 166. The conduit 166 is mounted by suitable means such as bolts 168 upon a channel or other load-carrying or positioning member 170. In the operation of this embodiment of our invention fluid under pressure is circulated through the conduit 166 and we have found that molten material, such as glass marked G⁷, which seeps through the joints between the blocks, collects around the conduit 166 as shown to provide a tight seal between the seam of the blocks and likewise to function to anchor and hold the blocks 162 in fixed relation to the channel 170.

From the foregoing it will be recognized that the objects of our invention have been achieved by the provision of improved methods and apparatus for cooling the seams of material melting tanks, such as glass tanks, and particularly where these tanks are made of cast refractory having a high thermal conductivity. The means for cooling the seams between the blocks may serve also to lock or support the blocks in the desired position and further by the principles herein disclosed and claimed we are able to cool the seams and joints between blocks of glass melting tanks while simultaneously heating the glass at other portions of the tank remote from the seams by passage of heat through the refractory blocks themselves.

In the actual use of our improved tank structures, walls and methods and apparatus for preventing the escape of molten material from refractory tanks, it should be appreciated that the refractory blocks or tanks herein disclosed and illustrated can be made of any desired size or shape without departing from our inventive concept. Particularly, the blocks may be made of sufficient height or length, as for example to extend the full height or width of a side or bottom wall, so that only the fewest possible number of joints between the blocks will be required, because thereby difficulties of cooling the joints are reduced.

Although the invention has been particularly described in conjunction with cast refractory blocks having relatively high thermal conductivity because of the special problems attending their use, it will be appreciated that many of the principles of our invention are applicable also to use with ordinary bonded refractory blocks. Further, certain of the embodiments of the invention illustrated have insulating means surrounding the tanks or walls thereof. We contemplate the use of such means particularly with cast refractory blocks and generally where desirable.

The present application is a division of our parent application Serial No. 169,108, filed October 15, 1937, and entitled "Melting tanks and apparatus for cooling seams thereof."

While in accordance with the patent statutes several embodiments of our invention have been illustrated and described in detail, it should be understood that the invention is not limited thereto or thereby but is defined in the appended claims.

We claim:

1. A material melting tank comprising cast refractory blocks forming walls, the engaging faces of the blocks being formed with complementary grooves defining a passage, said passage being entirely between and spaced from the inner and outer confines of the wall, means for supplying cooling gas to the passage to solidify molten material tending to escape through the joints between the blocks, an apertured conduit positioned in the passage, and means for supplying cooling liquid to the conduit to control the temperature of the cooling gas in the passage.

2. A material melting tank comprising refractory blocks forming walls, the engaging faces of the blocks being formed with completely self-contained complementary grooves defining a fluid conveying passage, said passage being entirely between and spaced from the inner and outer confines of the wall, and means for supplying cooling fluid to the passage to solidify any molten material tending to move through the joints between the blocks.

3. A glass melting tank comprising refractory blocks forming walls, at least one of each of the interengaging faces of the blocks being formed with a groove defining a passage, said passage being entirely between and spaced from the inner and outer confines of the wall, and means for supplying cooling fluid to the passage to solidify any molten glass tending to move through the joints between the blocks.

4. In a material melting tank, a plurality of cast refractory blocks forming a wall, with seams between the blocks extending away from the material engaging surfaces of the blocks, said blocks being formed with internal passages parallel to the surfaces of the blocks in engagement with the material and other passages parallel with the surfaces of the blocks forming the seams, means for passing cooling fluid through the last-named passages, means for passing heating fluid through at least some of the first-named passages, means for insulating the heating fluid from the cooling fluid, and means for insulating the surface of the blocks remote from the material.

5. In a material melting tank, a plurality of cast refractory blocks forming a wall, with seams between the blocks extending away from the material engaging surfaces of the blocks, said blocks being formed with internal passages parallel to the surfaces of the blocks in engagement with the material and other passages parallel with the surfaces of the blocks forming the seams, means for passing cooling fluid through the last-named passages, means for passing heating fluid through at least some of the first-named passages, and means for insulating the heating fluid from the cooling fluid.

6. In a material melting tank, a plurality of cast refractory blocks forming a wall, with seams between the blocks extending away from the material engaging surfaces of the blocks, said blocks being formed with relatively small individually contained and self-enclosed internal passages parallel with and closely adjacent the surfaces of the blocks forming the seams, means for passing cooling fluid through the last-named passages, and means for insulating the surface of the blocks remote from the material.

7. In a material melting tank, a plurality of refractory blocks forming a wall, with seams between the blocks extending away from the material engaging surfaces of the blocks, at least certain of said blocks being formed with relatively small individually contained and self-enclosed internal passages parallel with the surfaces of the blocks forming the seams, and means for passing cooling fluid through the last-named passages so as to cool the seams.

8. In a material-melting tank, a plurality of cast refractory blocks forming a wall having seams between the blocks extending away from the material engaging surfaces of the blocks, said blocks being formed with a plurality of internal passages parallel with the surfaces of the blocks forming the seams, and header conduits for passing cooling fluid through the passages.

9. In a material melting tank, a plurality of refractory blocks forming a wall, with seams between the blocks extending away from the material engaging surfaces of the blocks, said wall having therein means for withdrawing heat directly by conduction substantially only from the portions of said blocks along said seams, said means being positioned between and spaced from the inner and outer limits of the wall, the surfaces of said blocks in the zones disposed substantially away from said seams being substantially free of forced cooling to reduce heat losses through said wall beyond that necessary to prevent leakage of the melted material at said seams.

HENRY H. BLAU.
KENNETH K. KNAELL.